(12) United States Patent
Wang

(10) Patent No.: US 9,513,150 B2
(45) Date of Patent: Dec. 6, 2016

(54) METHOD FOR OPERATING A CORIOLIS MASS FLOWMETER

(71) Applicant: Krohne AG, Basel (CH)

(72) Inventor: Tao Wang, Canterbury (GB)

(73) Assignee: Krohne AG, Basel (CH)

(*) Notice: Subject to any disclaimer, the term of this patent is extended or adjusted under 35 U.S.C. 154(b) by 0 days.

(21) Appl. No.: 14/963,567

(22) Filed: Dec. 9, 2015

(65) Prior Publication Data

US 2016/0209257 A1   Jul. 21, 2016

(30) Foreign Application Priority Data

Jan. 15, 2015 (DE) .................. 10 2015 100 573

(51) Int. Cl.
  *G01F 1/84* (2006.01)
  *G01F 15/02* (2006.01)

(52) U.S. Cl.
  CPC ............... *G01F 1/8495* (2013.01); *G01F 1/84* (2013.01); *G01F 1/8436* (2013.01); *G01F 15/02* (2013.01); *G01F 15/022* (2013.01)

(58) Field of Classification Search
  CPC .................................. G01F 1/84; G01F 17/00
  USPC 73/497, 504.12, 861.355–861.357; 702/104, 99
  See application file for complete search history.

(56) References Cited

U.S. PATENT DOCUMENTS

| 5,902,931 A * | 5/1999 | Mori ................. G01C 19/5649 73/504.12 |
| 7,801,694 B1 * | 9/2010 | Watson ................. G01C 19/56 702/104 |
| 8,104,361 B2 | 1/2012 | Kolahi |
| 9,207,212 B2 | 12/2015 | Kolahi et al. |
| 2002/0100322 A1 * | 8/2002 | Ebara ................. G01C 19/5642 73/497 |
| 2013/0121376 A1 | 5/2013 | Mansfield |
| 2013/0338943 A1 | 12/2013 | Kolahi et al. |

FOREIGN PATENT DOCUMENTS

WO    2014/200672 A1    12/2014

* cited by examiner

*Primary Examiner* — Jewel V Thompson
(74) *Attorney, Agent, or Firm* — David S. Safran

(57) ABSTRACT

A method for operating a Coriolis mass flowmeter that has at least one measuring tube, at least one oscillation generator, at least two oscillation sensors and at least one evaluation unit, wherein the oscillation sensors and/or oscillation generator has at least one coil, wherein the oscillation generator excites the measuring tube to oscillation, wherein the oscillation sensors detect the oscillations of the measuring tube, wherein the temperature of the measuring tube is determined and wherein the evaluation unit processes the detected oscillation signals and determines state variables of the Coriolis mass flowmeter. The electric impedance of the coil of the oscillation generator and/or the electric impedance of at least one coil of the oscillation sensors is determined and the evaluation unit calculates at least one temperature-dependent state variable which is based on the temperature of the measuring tube and which is corrected based upon the determined impedance of the coil.

9 Claims, 6 Drawing Sheets

METHOD FOR OPERATING A CORIOLIS MASS FLOWMETER

BACKGROUND OF THE INVENTION

Field of the Invention

The invention relates to a method for operating a Coriolis mass flowmeter wherein the Coriolis mass flowmeter has at least one measuring tube, at least one oscillation generator, at least two oscillation sensors and at least one evaluation unit, wherein the oscillation sensors and/or oscillation generator include each at least one permanent magnet and each at least one coil, wherein the oscillation generator excites the measuring tube to oscillation, wherein the oscillation sensors detect the oscillations of the measuring tube, wherein the temperature of the measuring tube is determined and wherein the evaluation unit processes the detected oscillation signals and determines state variables of the Coriolis mass flowmeter.

Description of Related Art

Coriolis mass flowmeters are known in a plurality of designs in the prior art. Mass flowmeters, which function using the Coriolis principle, have at least one oscillation generator, with which the measuring tube is excited to oscillation- or optionally also several measuring tubes that are excited to oscillation-, as well as at least two oscillation sensors, with which the desired oscillation or desired oscillations of the measuring tube is/are detected. The oscillation sensors are attached to the measuring tube at the inlet and the outlet. In the case that a medium having mass is flowing through the measuring tube and the measuring tube is set into oscillation, counteracting oscillation portions result at the inlet and outlet, which are determined by the oscillation sensors. In the case of no flow, the signals of both oscillation sensors are in-phase in the ideal case. The reason for oscillation portions that are increasingly different at the inlet and outlet with increasing mass flow is that there are differently directed Coriolis forces on the flowing medium at the inlet and outlet.

Oscillation generators from Coriolis mass flowmeters of the type mentioned above include a coil and a permanent magnet. The permanent magnet is, at any rate, arranged in the influencing portion of the coil so that the magnetic field generated during current feed of the coil interacts with the magnetic field of the permanent magnet and corresponding forces act on the coil and the permanent magnet. The amount of electric current with which the coils is impinged is decisive for the force that is transferred from the oscillation generator to the measuring tube and that excites the measuring tube to oscillation; the current feed of the coil generally occurs harmonically, and thus, also the application of force on the measuring tube. When the Coriolis mass flowmeter is viewed as a dynamic system with the input variable excitation force and the output variable measuring tube deflection- or a variable derived temporally therefrom such as measuring tube velocity-, then, at a known excitation force and a measured measuring tube velocity, information is available for identifying the transfer behavior of the dynamic system Coriolis mass flowmeter. If identification is carried out on the basis of a mathematical model, it is possible to define the parameters used in the model, such as the spring stiffness of the measuring tube, the damping of the measuring tube and the oscillating overall mass see, German Patent Application DE 10 2012 011 934 A1 and corresponding U.S. Patent Application Publication 2013/0338943 A1, as well as German Patent Application DE 10 2008 059 920 A1 and corresponding U.S. Pat. No. 8,104,361 B2.

The physical parameters and thus also the functional relationships, however, are often subject to further influences, which are taken into consideration in the ideal case, in order to achieve exact measuring results. For example, the spring stiffness of the measuring tube, among other things, is temperature-dependent. Methods are known to the applicant from the prior art, in which the measuring tube temperature is measured by a sensor attached to the measuring tube, in order, for example, to be able to take the temperature-dependence of the spring stiffness of the measuring tube into consideration.

SUMMARY OF THE INVENTION

Thus, a primary object of the invention is to provide a method for operating a Coriolis mass flowmeter that has a higher accuracy when determining state variables or values for state variables.

The object derived above is achieved with a method for operating a Coriolis mass flowmeter of the type being discussed here in that the electric impedance of the coil of the oscillation generator and/or the electric impedance of at least one coil of the oscillation sensors is determined, and that the evaluation unit calculates at least one temperature-dependent state variable, wherein the temperature-dependent state variable is corrected based on the temperature of the measuring tube with the determined impedance of the coil.

The temperature-dependent state variable can be a technical-physical variable of the Coriolis mass flowmeter, however, it can also be a fictive characteristic variable that, for example, is suitable for monitoring a go-state of the respective Coriolis mass flowmeter; such a fictive characteristic variable could be related to the spring stiffness of the measuring tube, without exactly reproducing the spring stiffness itself.

The method according to the invention makes possible a compensation of temperature effects, in particular those that are related to the temperature-dependence of the magnetization of the permanent magnets used here. For low temperatures, i.e., temperatures below the Curie temperature, the following mathematical equation according to Bloch is known:

$$\frac{M(T)}{M(0)} = 1 - \left(\frac{T}{T_C}\right)^{3/2}$$

MT is the magnetization of a permanent magnet, MO is the magnetization at absolute zero. T is the temperature and $T_c$ is the Curie temperature. Since the strength of the magnet—its spontaneous magnetization—is decisive for the force transferred by the oscillation generator, the magnet temperature also influences the accuracy of a calculated parameter or a state variable.

In the method according to the invention, it is not necessary to measure the magnet temperature in a complicated manner. The coil resistance, or the electric impedance of the coil, provides a relation that allows for a compensation of the influence of the magnet temperature. It is advantageous here, that the coil whose impedance is determined is arranged, as is functionally necessary, in the immediate proximity of its assigned permanent magnet, and consequently, the temperature of the coil corresponds in a good approximation to the temperature of the permanent magnet. Since the impedance or the ohmic resistance of the coil is generally also temperature-variable, the determined impedance of the coil is a reliable indicator for the temperature of the coil and for the temperature of the permanent magnet provided in immediate proximity In order to increase the accuracy, it is provided in a further implementation of the method that the correction of the temperature-dependent state variable is performed on the basis of at least one known temperature coefficient for describing the temperature-dependence of the coil. By using this information, the temperature of the coil can be deduced directly by measuring the coil impedance or the ohmic resistance of the coil. Thus, by determining the coil impedance, a more exact determination of the coil temperature or the temperature of the permanent magnet, which are related to the magnet temperature, and thus a better compensation of effects is possible.

A further implementation of the method according to in the invention provides that a reference value for the temperature-dependent state variable is determined in the running process before the Coriolis mass flowmeter is initialized. Before initialization can mean that the device is calibrated with a reference value before leaving production. This can be stored in the device before delivery. It is also possible that the reference value is determined on-site during installation in a process, when the Coriolis mass flowmeter is integrated in the process, but has not yet been started up. Additionally, it is useful that the device is calibrated again when process conditions are changed, i.e., a new reference value can be calculated. Changing process conditions can be caused by dismounting the device or integrating the device in a new process or, for example, also by changing the flowing medium.

In a further implementation of the method, it is provided that the reference value of the temperature-dependent state variable is compared to a measured value of the temperature-dependent state variable determined during operation. The measured value determined during operation can be determined at arbitrary intervals or continually. The continuous comparison with the reference value allows for statements to be made as to what extent the current state of the Coriolis mass flowmeter corresponds to the original state at the point in time of reference value determination.

In a further implementation of the method, it is provided that, when a pre-defined deviation of the reference value from the measured value of the state temperature-dependent variable determined during operation is exceeded, a signal is issued by the evaluation unit. The signal can simply be the setting of a flag, i.e., for example, setting a bit in a storage cell within the electronics of the Coriolis mass flowmeter. The signal can, however, also be issued electrically, acoustically or visually via an interface of the Coriolis mass flowmeter. In particular, the signals can be subsequently issued in a master control center, which makes it clear to the operator that the state of the measuring device has changed, for example, a go-state is no longer present.

The calculation of the temperature-dependent state variable, and thus, also the reference value and/or measured value of the temperature-dependent state variable is preferably carried out in dependence on the measuring tube temperature and the detected coil impedance, i.e., according to an equation in the form of $D=f(T, R_{drv})$. Preferably, the determination is carried out in relation to each of a reference temperature value $T_0$ and a reference impedance value $R_{drv,0}$, thus then according to an equation in the form of $D=f(\Delta T, \Delta R_{drv})$.

The calculation of the temperature-dependent value $D_{ref}$ and/or measured value $D_{mess}$ of the state variable D is/are determined, in one implementation of the method according to the invention, by using the following equation:

$$D=\alpha_1+\alpha_2\Delta T+\alpha_3\Delta R_{drv}$$

where $\Delta R_{drv}$ corresponds to the change of the electric impedance of the coil in respect to a pre-defined reference value $R_{drv,0}$ and $\Delta T$ to the change of the measuring tube temperature in respect to a pre-determined reference value $T_0$. The coefficients $\alpha_1$ to $\alpha_3$, with $\alpha_i \in R$, can be of empirical nature and be related solely to an individual measuring device or also to a certain type of a measuring device.

The state variables derived from the oscillation behavior provide information about the structural nature of the Coriolis mass flowmeter. The oscillation behavior of a Coriolis mass flowmeter can be mathematically described by a Lagrange equation of the second kind. Thereby, an oscillation in the first natural mode, i.e., an excitation of the measuring tube to oscillation at a large as possible amplitude, wherein a deformation or even destruction of the measuring tube is avoided, represents an in-phase, translational movement of the masses of the measuring tube. A rotation of the masses around the central point of the measuring tube corresponds to an oscillation in the second natural mode. All viewed natural modes can be represented in a differential equation system, wherein the deciding factors are the inertia matrix, the damping matrix and the stiffness matrix.

For this reason, it is of particular advantage in one implementation of the method for operating a Coriolis mass flowmeter according to the invention that the temperature-dependent state variables are calculated in dependence on the stiffness of the measuring tube. A statement about the stiffness provides a good approximation of the lifespan and functionality of the Coriolis mass flowmeter.

It is also advantageous in a further implementation of the method according to the invention that the state variables are calculated in dependence on the damping of the measuring tube.

In a further implementation of the method, it is accordingly provided that the state variables are calculated in dependence on the mass of the measuring tube.

It is important in calculating the state variables, to what extent the measuring tube of the Coriolis mass flowmeter is excited to oscillation or into which natural mode it is excited to oscillation. For the identification of a state variable in dependence on the stiffness of the measuring tube, oscillation is preferably generated in "drive mode", which corresponds to an oscillation in the first natural mode.

In detail, there are numerous possibilities for designing and further developing the method for operating a Coriolis mass flowmeter according to the invention as will become apparent from the following description of preferred embodiments in conjunction with the accompanying drawings.

DETAILED DESCRIPTION OF THE INVENTION

Figures 1A, 1B:
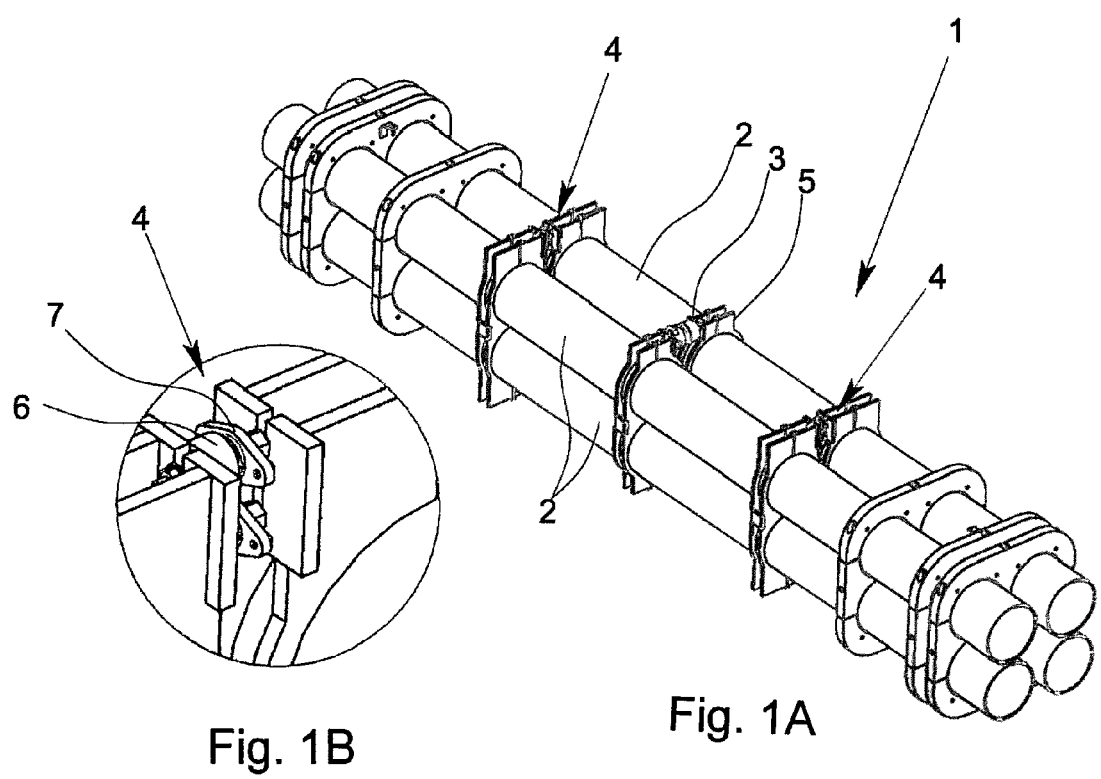
FIGS. 1A & 1B are a perspective view of an embodiment of a Coriolis mass flowmeter and enlarged detail of the area of an oscillation sensor.

FIG. 1 shows an embodiment of a Coriolis mass flowmeter 1 having four measuring tubes 2. The oscillation generator 3 and oscillation sensors 4 are joined with the measuring tubes 2 by means of a special fixture. In this case, both the oscillation sensors 4 as well as the oscillation generator 3 each have a permanent magnet 6 and a coil 7. In this manner, oscillations can be transferred electrically to the measuring tube 2 and oscillations of the measuring tube 2 can be detected. The oscillation sensors 4 are attached to the measuring tube 2 at the inlet and outlet. Without flow, the signals of the two oscillation sensors 4 are essentially in-phase. In the case of mass flow, differently directed Coriolis forces result at the inlet and outlet, which lead to a phase shift between deflections, and thus, the signals of the oscillation sensors 4 exhibit a phase shift that is proportional to the mass flow within the measuring tube 2.

However, the oscillation behavior of the measuring tube 2 is not only dependent on the excitation of the measuring tube 2, but also on the measuring tube temperature that affects the stiffness of the measuring tube, on a possible structural change of the measuring tube 2, for example, due to corrosion, or also on the temperature dependence of the transfer behavior of the oscillation generator 3. During operation of a Coriolis mass flowmeter, it is thus desired to compensate for such temperature effects, either when determining the physical parameter of the Coriolis mass flowmeter, via physical state variables or via derived state variables D that do not have to have direct physical importance, but are suitable for determining the state, and thus, also a change in the state of the Coriolis mass flowmeter.

Figure 2:
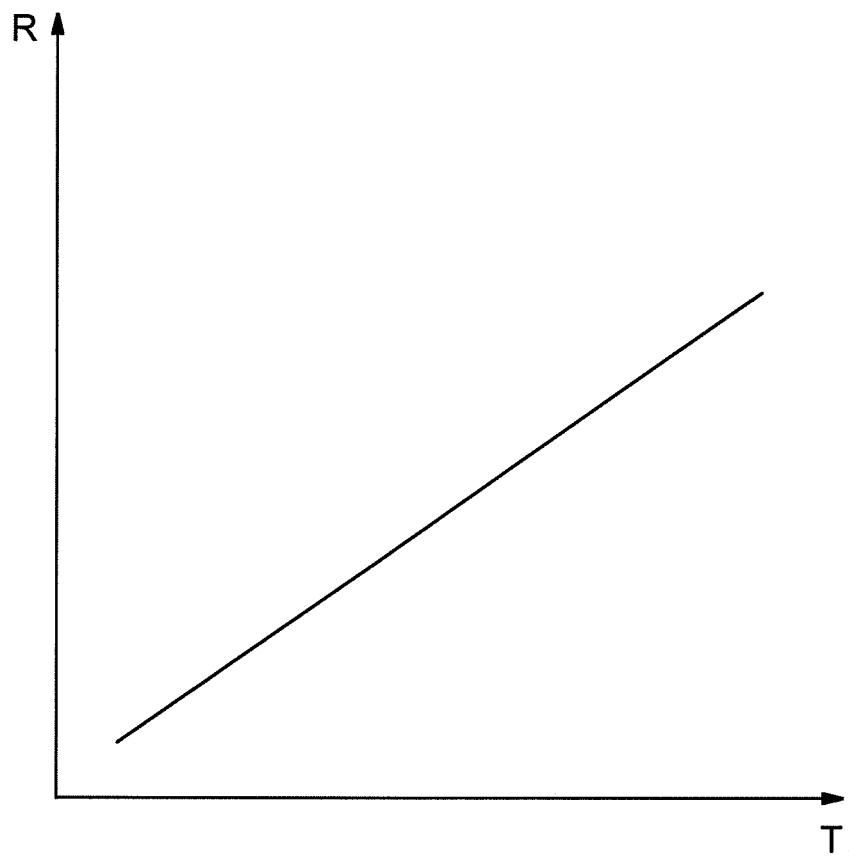
FIG. 2 is a graph showing the dependence of the electric impedance of the coil on the measuring tube temperature during stationary conditions.

FIG. 2 shows a qualitative representation of the coil impedance R plotted against the measuring tube temperature T during stationary conditions. In the stationary case, i.e., at a constant measuring tube temperature, a linear relation exists between the coil impedance R and the measuring tube temperature T.

Figure 3:
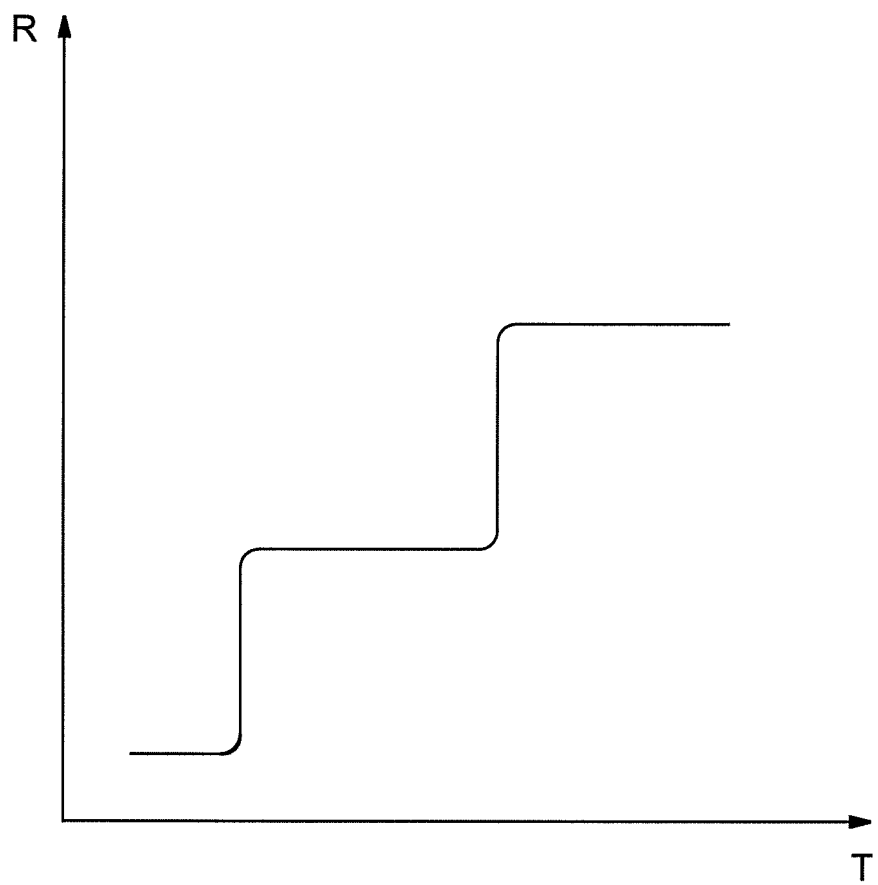
FIG. 3 is a graph showing the dependence of the electric impedance of the coil on the measuring tube temperature during non-stationary conditions.

In contrast, FIG. 3 shows a qualitative representation of the coil impedance R plotted against the measuring tube temperature T during thermally unsteady conditions, i.e., at changing measuring tube temperatures. A change in the measuring tube temperature T horizontal, x-axis leads to a distinctly delayed reaction of the coil impedance R. This delay leads to typical hysteresis effects both at temperature increase and decrease. This leads to the insight that temperature-dependent effects in the oscillation generator 3 can only be insufficiently compensated with a detected temperature of the measuring tube 2, and, on the other hand, that temperature-dependent effects of the measuring tube 2 can only be insufficiently compensated with a detected temperature of the oscillation generator 3. The proposed method for operating a Coriolis mass flowmeter deals with this circumstance, in that the temperature-dependent state variable D of interest based on the temperature of the measuring tube 2 is corrected with the determined impedance of the coil, since information about the temperature of the permanent magnet 6 is contained in the impedance of the coil 7.

Figure 4:
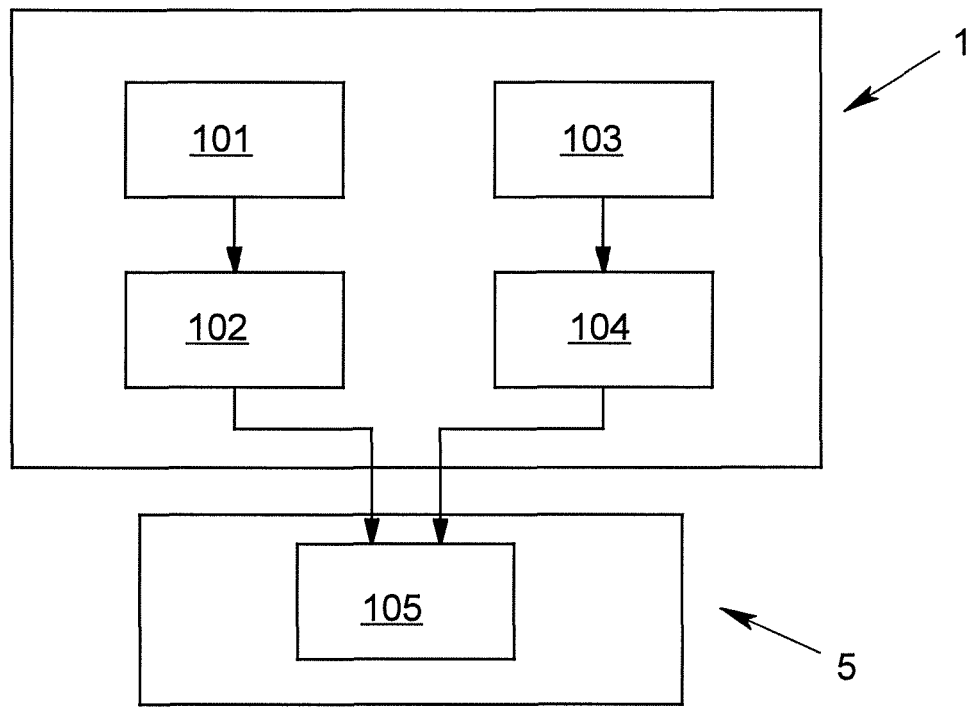
FIG. 4 is a schematic representation of an implementation of the method for operating a Coriolis mass flowmeter.

FIG. 4 shows the schematically represents an implementation of the method described above. The oscillation generator 3 mounted on the Coriolis mass flowmeter 1 excites the measuring tube 2 to oscillation in a first step 101. The oscillations are then detected by the oscillation sensors 4 in step 102. In parallel, the temperature of the measuring tube 2 is determined. Subsequently, the electric impedance of the coil is determined in step 104. The chronological order of these steps is not defined by the order shown in FIG. 4. Detection of oscillations, determination of measuring tube temperature and determination of the coil impedance are carried out successively, but can also take place simultaneously.

The recorded signals are transferred to an evaluation unit 5. The evaluation unit 5 calculates one or more state variables D of the Coriolis mass flowmeter 1 with the recorded signals. Since the preferred state variables, which can provide information about the current nature of the Coriolis mass flowmeter 1, are partially temperature-dependent, the measuring tube temperature is used for determining the actual temperature-dependent state value.

The resulting measuring tube oscillations are independent of the excitation force applied by the current feed to the oscillation generator. The generated force is, in turn, dependent on the temperature of the permanent magnet 6, since its magnetization is temperature-dependent. In particular, the relation that is made clear in FIG. 2 and FIG. 3 prompts the determination of the magnet temperature or a variable that is associated with the magnet temperature or the nearby coil. In this embodiment of the invention, the coil 7 has a known temperature coefficient. Thus, a relation is given to the temperature. A temperature-dependent state variable D is then calculated in step 105 by the evaluation unit using $$D = \alpha_1 + \alpha_2 \Delta T + \alpha_3 \Delta R_{drv}$$

where $\Delta T$ is the change in measuring tube temperature and $\Delta R_{drv}$ is the change in electric impedance of the coil. The coefficients $\alpha_1$ to $\alpha_3$ represent empirical parameters for the specific Coriolis mass flowmeter.

Figure 5:
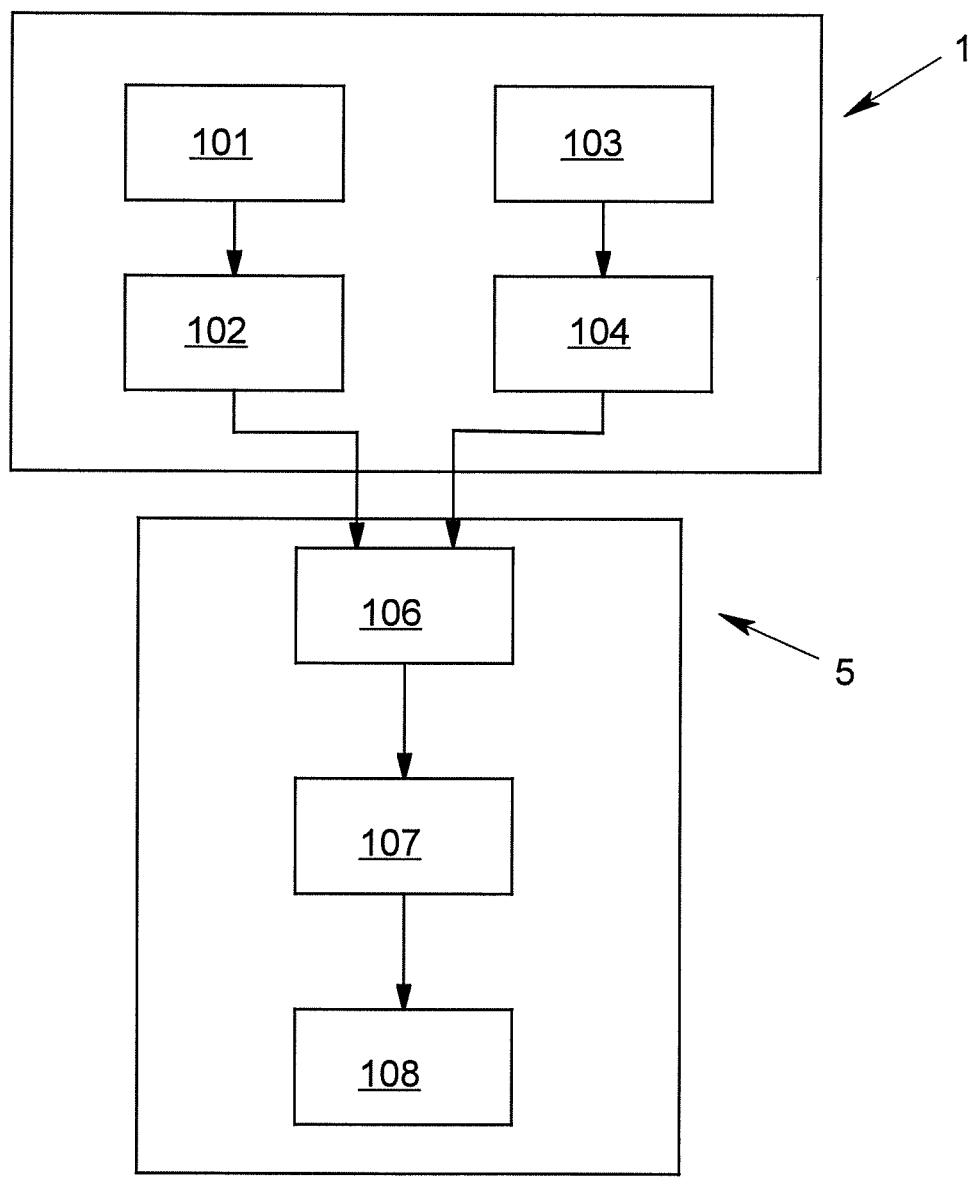
FIG. 5 is a schematic representation of a further implementation of the method for operating a Coriolis mass flowmeter.

FIG. 5 shows a further development of the method. As already shown in FIG. 4, oscillations are generated in step 101 and these are subsequently recorded in step 102. In the same manner, the measuring tube temperature T and the electric coil impedance R are determined, so that the evaluation unit 5 can calculate state variables using the determined values. In the further development of the method according to FIG. 5, a reference value $D_{ref}$ of the state variable D, determined in the running process before the Coriolis mass flowmeter is initialized, is determined in step 106. Not until operation has started are values $D_{mess}$ of the state variable D continuously calculated from the recorded signals in step 107. The calculated values $D_{mess}$ are additionally continuously compared to the previously-determined reference value $D_{ref}$ in step 108.

Figure 6:
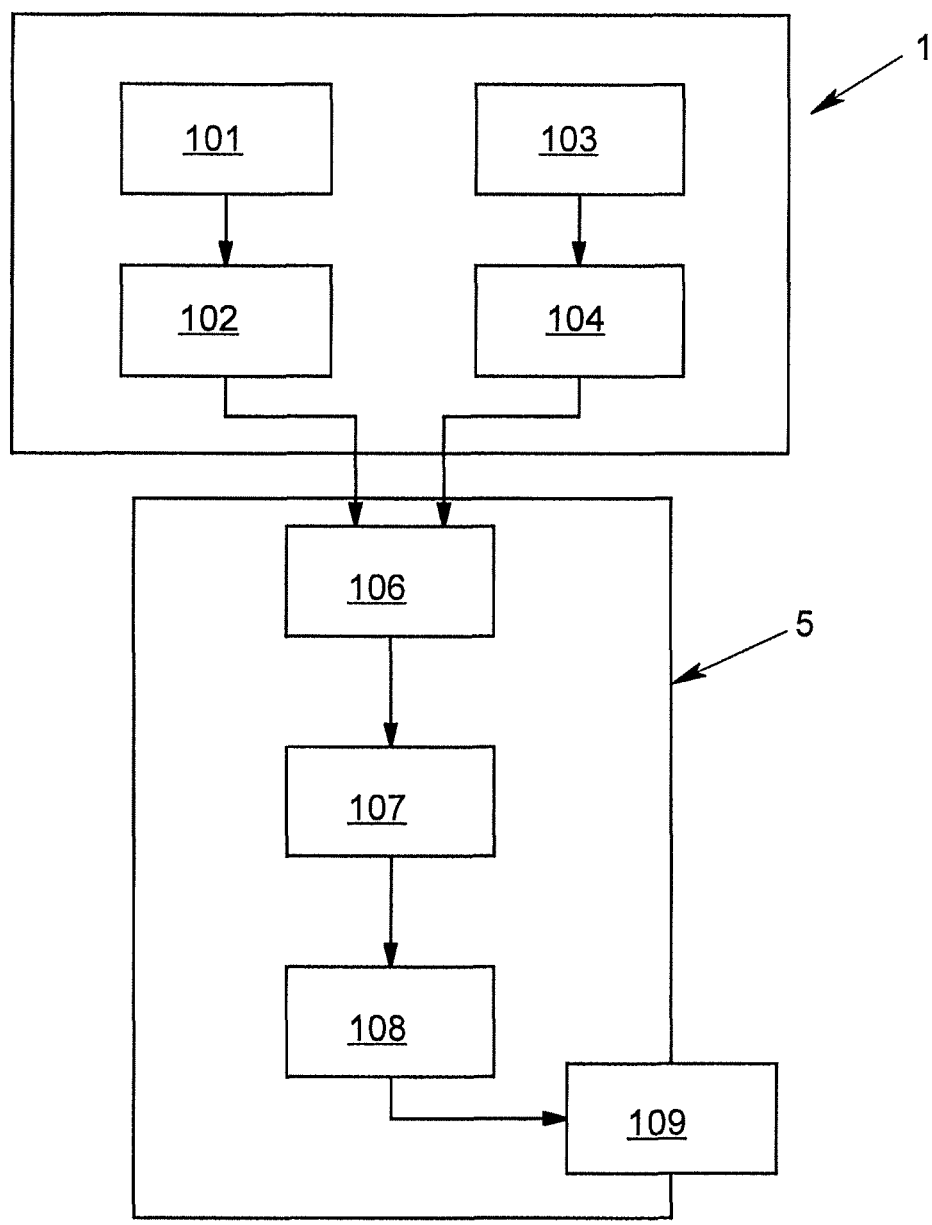
FIG. 6 is a schematic representation of another implementation of the method for operating a Coriolis mass flowmeter.

FIG. 6 shows a further embodiment of the method for operating a Coriolis mass flowmeter 1. In addition to the steps shown in FIG. 5, the deviation of the two comparison values $D_{ref}$ and $D_{mess}$ is determined in step 109 using the equation $$E = \frac{D_{mess} - D_{ref}}{D_{ref}}$$

If the deviation E exceeds a previously set threshold value, a signal is issued by the evaluation unit 5. The operator of the Coriolis mass flowmeter can then see that the state of the measuring device has changed, and if necessary, take steps to re-establish the desired state.

What is claimed is:

1. Method for operating a Coriolis mass flowmeter having at least one measuring tube, at least one oscillation generator, at least two oscillation sensors and at least one evaluation unit, wherein at least one the oscillation sensors and the oscillation generator include at least one permanent magnet and at least one coil, comprising the steps of:
   using the oscillation generator to excite the measuring tube to oscillation,
   using the oscillation sensors to detect oscillations of the measuring tube,
   determining the temperature of the measuring tube and
   using the evaluation unit to process the detected oscillation signals and determine state variables of the Coriolis mass flowmeter,
   wherein the electric impedance of at least one of the coil of the oscillation generator and the at least one coil of the oscillation sensors is determined and
   wherein the evaluation unit calculates at least one temperature-dependent state variable D, wherein the temperature-dependent state variable D is corrected based on the determined impedance of the coil.

2. Method according to claim 1, wherein the correction of the temperature-dependent state variable D is performed based on a temperature coefficient of the impedance of the coil.

3. Method according to claim 1, wherein a reference value $D_{ref}$ for the temperature-dependent state variable D is determined in a running process before the Coriolis mass flowmeter is initialized.

4. Method according to claim 3, wherein the reference value $D_{ref}$ of the temperature-dependent state variable D is compared to a measured value $D_{mess}$ of the temperature-dependent state variable D determined during operation.

5. Method according to claim 4, wherein a signal is issued by the evaluation unit when a pre-defined deviation E of the reference value $D_{ref}$ from the measured value $D_{mess}$ of the temperature-dependent state variable D determined during operation is exceeded.

6. Method according to claim 4, wherein at least one the reference value $D_{ref}$ and the measured value $D_{mess}$ of the temperature-dependent state variable D is determined using the relation:

$$D = \alpha_1 + \alpha_2 \Delta T + \alpha_3 \Delta R_{drv}$$

wherein $R_{drv}$ is the electric impedance of the coil, T is the measuring tube temperature, and coefficients $\alpha_1$ to $\alpha_3$ are empirically determined parameters for the specific Coriolis mass flowmeter.

7. Method according claim 1, wherein the temperature-dependent state variable D is calculated in dependence on the stiffness of the measuring tube.

8. Method according claim 1, wherein the temperature-dependent state variable D is calculated in dependence on the damping of the measuring tube.

9. Method according claim 1, wherein the temperature-dependent state variable D is calculated in dependence on the mass of the measuring tube.

* * * * *